United States Patent
Jung et al.

(10) Patent No.: US 12,360,900 B2
(45) Date of Patent: Jul. 15, 2025

(54) PROCESSOR, SYSTEM, AND METHOD FOR DYNAMIC CACHE ALLOCATION

(71) Applicant: Samsung Electronics Co., Ltd., Suwon-si (KR)

(72) Inventors: Jin Jung, Suwon-si (KR); Daehoon Kim, Suwon-si (KR); Hwanjun Lee, Daegu-si (KR); Jonggeon Lee, Suwon-si (KR); Jinin So, Suwon-si (KR)

(73) Assignees: SAMSUNG ELECTRONICS CO., LTD., Suwon-si (KR); Daegu Gyeongbuk Institute Of Science And Technology, Daegu (KR)

( * ) Notice: Subject to any disclaimer, the term of this patent is extended or adjusted under 35 U.S.C. 154(b) by 0 days.

(21) Appl. No.: 18/589,852

(22) Filed: Feb. 28, 2024

(65) Prior Publication Data
US 2024/0311302 A1    Sep. 19, 2024

(30) Foreign Application Priority Data

Mar. 15, 2023  (KR) .................. 10-2023-0034175
Jun. 26, 2023  (KR) .................. 10-2023-0082190

(51) Int. Cl.
*G06F 12/08*   (2016.01)
*G06F 12/0811*  (2016.01)
*G06F 12/084*   (2016.01)

(52) U.S. Cl.
CPC ........ *G06F 12/0811* (2013.01); *G06F 12/084* (2013.01)

(58) Field of Classification Search
CPC .................. G06F 12/0811; G06F 12/084
See application file for complete search history.

(56) References Cited

U.S. PATENT DOCUMENTS

| | | | |
|---|---|---|---|
| 9,110,592 B2 | 8/2015 | Lee et al. | |
| 2016/0342514 A1* | 11/2016 | Wang | ............... G06F 3/0604 |
| 2021/0141731 A1 | 5/2021 | Bernat et al. | |
| 2022/0066931 A1 | 3/2022 | Ray et al. | |

(Continued)

FOREIGN PATENT DOCUMENTS

KR    10-2207598 B1    1/2021

OTHER PUBLICATIONS

H. Lee, S. Lee, Y. Jung and D. Kim, "T-CAT: Dynamic Cache Allocation for Tiered Memory Systems With Memory Interleaving," IEEE Computer Architecture Letters, Jul.-Dec. 2023, pp. 73-76, vol. 22, No. 2, pp. 73-76.

*Primary Examiner* — Jae U Yu
(74) *Attorney, Agent, or Firm* — Muir Patent Law, PLLC

(57) ABSTRACT

A processor includes a processing core configured to process each of a plurality of requests by accessing a corresponding one of a first memory and a second memory, a latency monitor configured to generate first latency information and second latency information, the first latency information comprising a first access latency to the first memory, and the second latency information comprising a second access latency to the second memory, a plurality of cache ways divided into a first partition and a second partition, and a decision engine configured to allocate each of the plurality of cache ways to one of the first partition and the second partition, based on the first latency information and the second latency information.

20 Claims, 14 Drawing Sheets

(56) References Cited

U.S. PATENT DOCUMENTS

2022/0224776 A1 7/2022 Doshi et al.
2023/0081829 A1 3/2023 Ryu et al.
2023/0082290 A1 3/2023 Yasin et al.

* cited by examiner

PROCESSOR, SYSTEM, AND METHOD FOR DYNAMIC CACHE ALLOCATION

CROSS-REFERENCE TO RELATED APPLICATIONS

This application is based on and claims priority under 35 U.S.C. § 119 to Korean Patent Application Nos. 10-2023-0034175, filed on Mar. 15, 2023, and 10-2023-0082190, filed on Jun. 26, 2023, in the Korean Intellectual Property Office, the disclosures of each of which are incorporated by reference herein in their entirety.

BACKGROUND

The inventive concept relates to a processor, and more particularly, to a processor, a system, and a method of dynamically allocating a cache in a tiered-memory environment.

New memory interconnect technologies, such as compute express link (CXL), may be used to expand memory bandwidth and memory capacity. For example, memory bandwidth and memory capacity may be expanded through a tiered-memory system in which local dynamic random-access memory (DRAM) and CXL-DRAM are mixed. When a processor accesses a memory to process a request of the processor, a memory interleaving technique may be used. However, when the processor accesses each memory system through the memory interleaving technique in the tiered-memory system, there may be a difference in latency. The difference in latency may cause performance degradation in applying non-uniform memory access (NUMA) interleaving in the tiered-memory system. Accordingly, there is a need for a method of alleviating such a difference in latency.

SUMMARY

The inventive concept provides a processor, system, and method for reducing a difference in average latency between tiered memories in a tiered-memory system.

The technical objectives of the inventive concept are not limited to the technical objectives mentioned above, and other technical objectives not mentioned herein will be clearly understood by one of ordinary skill in the art from the following description.

According to an aspect of the present disclosure, a processor includes a processing core configured to process each of a plurality of requests by accessing a corresponding one of a first memory and a second memory, a latency monitor configured to generate first latency information and second latency information, the first latency information comprising a first access latency to the first memory, and the second latency information comprising a second access latency to the second memory, a plurality of cache ways divided into a first partition and a second partition, and a decision engine configured to allocate each of the plurality of cache ways to one of the first partition and the second partition, based on the first latency information and the second latency information.

According to an aspect of the present disclosure, there is provided an operating method of a processor, the operating method including dividing a plurality of cache ways into a first partition and a second partition, based on a first masking value and a second masking value, the first masking value being a masking value of a first mask, and the second masking value being a masking value of a second mask, generating first latency information and second latency information, the first latency information including a first access latency to a first memory, and the second latency information including a second access latency to a second memory, and allocating the plurality of cache ways to the first partition and the second partition, based on sizes of the first access latency and the second access latency.

According to an aspect of the present disclosure, a system includes a processor comprising a plurality of processing cores, a first level cache, and a shared cache, a host memory configured to store data related to a plurality of requests of the processor, and a device configured to store data related to the plurality of requests of the processor. The first level cache includes a latency monitor configured to generate first latency information and second latency information, the first latency information comprising a first access latency to the host memory, and the second latency information comprising a second access latency to the device. The shared cache includes a plurality of cache ways divided into a first partition and a second partition, wherein a plurality of first cache ways among the plurality of cache ways are allocated to the first partition and a plurality of second cache ways among the plurality of cache ways are allocated to the second partition, and a decision engine configured to allocate each of the plurality of cache ways to one of the first partition and the second partition, based on the first latency information and the second latency information, which are received from the latency monitor.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
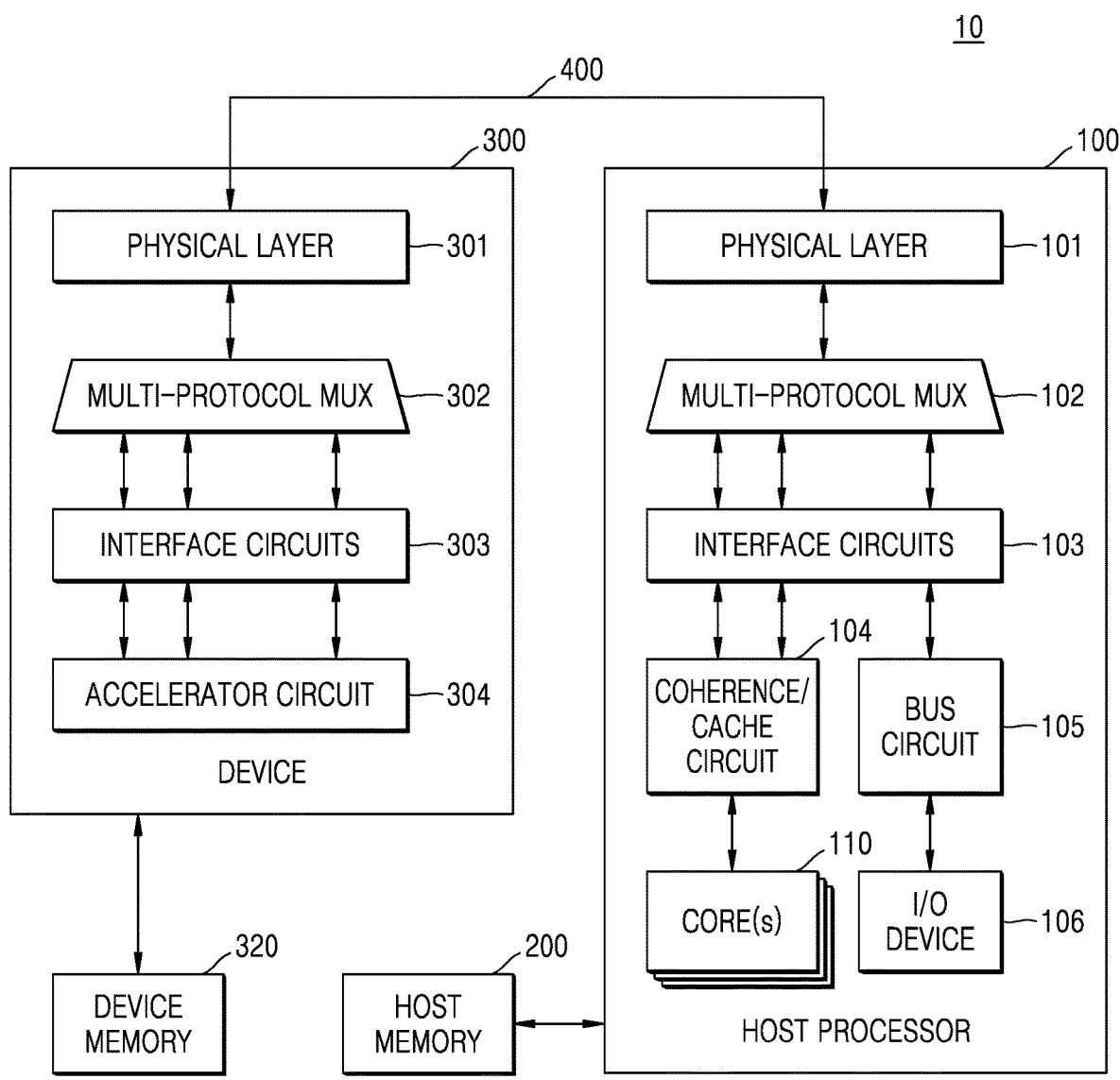
FIG. 1 is a block diagram illustrating a system according to an embodiment.

Hereinafter, embodiments will be described in detail with reference to the accompanying drawings. When descriptions are made with reference to the drawings, like or corresponding components are denoted by like reference numerals, and redundant descriptions thereof are omitted.

FIG. 1 is a block diagram illustrating a system 10 according to an embodiment.

Referring to FIG. 1, the system 10 may be a computing system (or a component included in a computing system)

including a device 300 and a host processor 100 that communicate with each other. For example, the system 10 may be included in a stationary computing system, such as a desktop computer, a server, and a kiosk, or may be included in a portable computing system, such as a laptop computer, a mobile phone, and a wearable device. In some embodiments, the system 10 may be included in a system-on-chip (SoC) or a system-in-package (SiP), in which the device 300 and the host processor 100 are implemented on a single chip or package. The system 10 may include the device 300, the host processor 100, a device memory 320, and a host memory 200.

The device 300 and the host processor 100 may communicate with each other through a link 400 and may transmit or receive a message and/or data to or from each other over the link 400. Although embodiments will be described with reference to the link 400 that operates based on a compute express link (CXL) specification supporting CXL protocols, the device 300 and the host processor 100 may communicate with each other based on coherent interconnect technologies such as, but not limited to, an XBus protocol, an NVLink protocol, an infinity fabric protocol, a cache coherent interconnect for accelerators (CCIX) protocol, and a coherent accelerator processor interface (CAPI).

In some embodiments, the link 400 may support multiple protocols, and a message and/or data may be transmitted through the multiple protocols. For example, the link 400 may support CXL protocols including a non-coherent protocol (e.g., CXL.io), a coherent protocol (e.g., CXL.cache), and a memory access protocol (or a memory protocol) (e.g., CXL.mem). In some embodiments, the link 400 may support protocols such as, but not limited to, peripheral component interconnect (PCI), PCI express (PCIe), universal serial bus (USB), and serial advanced technology attachment (SATA). Herein, a protocol supported by the link 400 may be referred to as an interconnect protocol.

The device 300 may refer to any device that provides a useful function to the host processor 100 and, in some embodiments, may correspond to an accelerator of the CXL specification. For example, software running on the host processor 100 may offload at least some of computing and/or input/output (I/O) tasks to the device 300. In some embodiments, the device 300 may include at least one of a programmable component, such as a graphics processing unit (GPU) and a neural processing unit (NPU), a fixed function-providing component, such as an intellectual property (IP) core, and a reconfigurable component, such as a field-programmable gate array (FPGA). The device 300 may include a physical layer 301, a multi-protocol multiplexer 302, interface circuits 303, and an accelerator circuit 304 and may communicate with the device memory 320.

The accelerator circuit 304 may perform a useful function, which the device 300 provides to the host processor 100, and may be referred to as accelerator logic. The accelerator circuit 304 may communicate with the host processor 100 through the interface circuits 303 by using multiple protocols. In some embodiments, the accelerator circuit 304 may include a component for resolving coherency of the device memory 320. In some other embodiments, the accelerator circuit 304 may be omitted from the device 300.

The interface circuits 303 may support multiple protocols. For example, the interface circuits 303 may include at least two circuits for at least two protocols of a non-coherent protocol, a coherent protocol, and a memory access protocol. Based on a corresponding protocol, each of the at least two circuits may provide the accelerator circuit 304 with a message received from the host processor 100 or may provide the host processor 100 with a message received from the accelerator circuit 304. Using the interface circuits 303, the host processor 100 may access the device memory 320 based on at least two protocols, and the host processor 100 may select an optimal protocol for accessing the device memory 320 as needed. Accordingly, due to the optimal protocol that provides a reduced latency of access to the device memory 320, the performance of the host processor 100 and the system 10 may be improved.

The multi-protocol multiplexer 302 may select one of multiple protocols based on a message and/or data for communication between the accelerator circuit 304 and the host processor 100. The multi-protocol multiplexer 302 may include at least one protocol queue to which the interface circuits 303 are connected. The interface circuits 303 may transmit and receive a message and/or data to and from the host processor 100 through the at least one protocol queue. In some embodiments, the interface circuits 303 and the multi-protocol multiplexer 302 may be integrated into one component. In some embodiments, the multi-protocol multiplexer 302 may include multiple protocol queues for multiple protocols supported by the link 400. For example, each of the multiple protocol queues may be assigned to a corresponding one of the multiple protocols. In some embodiments, the multi-protocol multiplexer 302 may arbitrate communications based on different protocols and may provide selected communications to the physical layer 301. In some embodiments, the physical layer 301 may be connected to a physical layer 101 of the host processor 100 through a single interconnect, bus, trace, or the like.

The device memory 320 may be connected to the device 300 and may be referred to as a device-attached memory. As illustrated in FIG. 1, when the device memory 320 is included in the system 10, the accelerator circuit 304 may communicate with the device memory 320 and may communicate with the device memory 320 based on a device-specific protocol which is independent of a protocol of the link 400. In some embodiments, the device 300 may include a memory interface as a component for accessing the device memory 320, and the accelerator circuit 304 and/or the interface circuits 303 may access the device memory 320 through the memory interface. The memory interface may provide not only access of the device 300, that is, the accelerator circuit 304, to the device memory 320 but also access of the host processor 100 to the device memory 320 through the link 400 and the interface circuits 303. In some embodiments, the device memory 320 may correspond to a device-attached memory of the CXL specification. Herein, the device memory 320 may be referred to as being included in the device 300 and may be referred to as a memory.

The host processor 100 may be a main processor, for example, a central processing unit (CPU), of the system 10 and, in some embodiments, may correspond to a host processor (or a host) of the CXL specification. The host processor 100 may be connected to the host memory 200 and may include the physical layer 101, a multi-protocol multiplexer 102, interface circuits 103, a coherence/cache circuit 104, a bus circuit 105, at least one core 110, and an I/O device 106.

The at least one core 110 may execute an instruction and may be connected to the coherence/cache circuit 104. The coherence/cache circuit 104 may include a cache hierarchy and may be referred to as a coherence/cache logic. The coherence/cache circuit 104 may communicate with the at least one core 110 and the interface circuits 103. For example, the coherence/cache circuit 104 may enable communication through at least two protocols including a coherent protocol and a memory access protocol. In some embodiments, the coherence/cache circuit 104 may include a direct memory access (DMA) circuit. The I/O device 106 may be used to communicate with the bus circuit 105. For example, the bus circuit 105 may be a PCIe logic, and the I/O device 106 may be a PCIe I/O device.

The interface circuits 103 may enable communication between components, for example, the coherence/cache circuit 104 and the bus circuit 105, of the host processor 100 and the device 300. In some embodiments, the interface circuits 103 may enable communication of a message and/or data between components of the host processor 100 and the device 300 according to multiple protocols, for example, a non-coherent protocol, a coherent protocol, and a memory protocol.

The multi-protocol multiplexer 102 may include at least one protocol queue. The interface circuits 103 may be connected to the at least one protocol queue included in the multi-protocol multiplexer 102 and may transmit and receive a message and/or data to and from the device 300 through the at least one protocol queue. In some embodiments, the multi-protocol multiplexer 102 may select one of multiple protocols based on a message and/or data for communication between components of the host processor 100 and the device 300. In some embodiments, the interface circuits 103 and the multi-protocol multiplexer 102 may be integrated into one component. In some embodiments, the multi-protocol multiplexer 102 may include multiple protocol queues for multiple protocols supported by the link 400. For example, each of the multiple protocol queues may be assigned to a corresponding one of the multiple protocols. In some embodiments, the multi-protocol multiplexer 102 may arbitrate communications based on different protocols and may provide selected communications to the physical layer 101.

Figure 2:
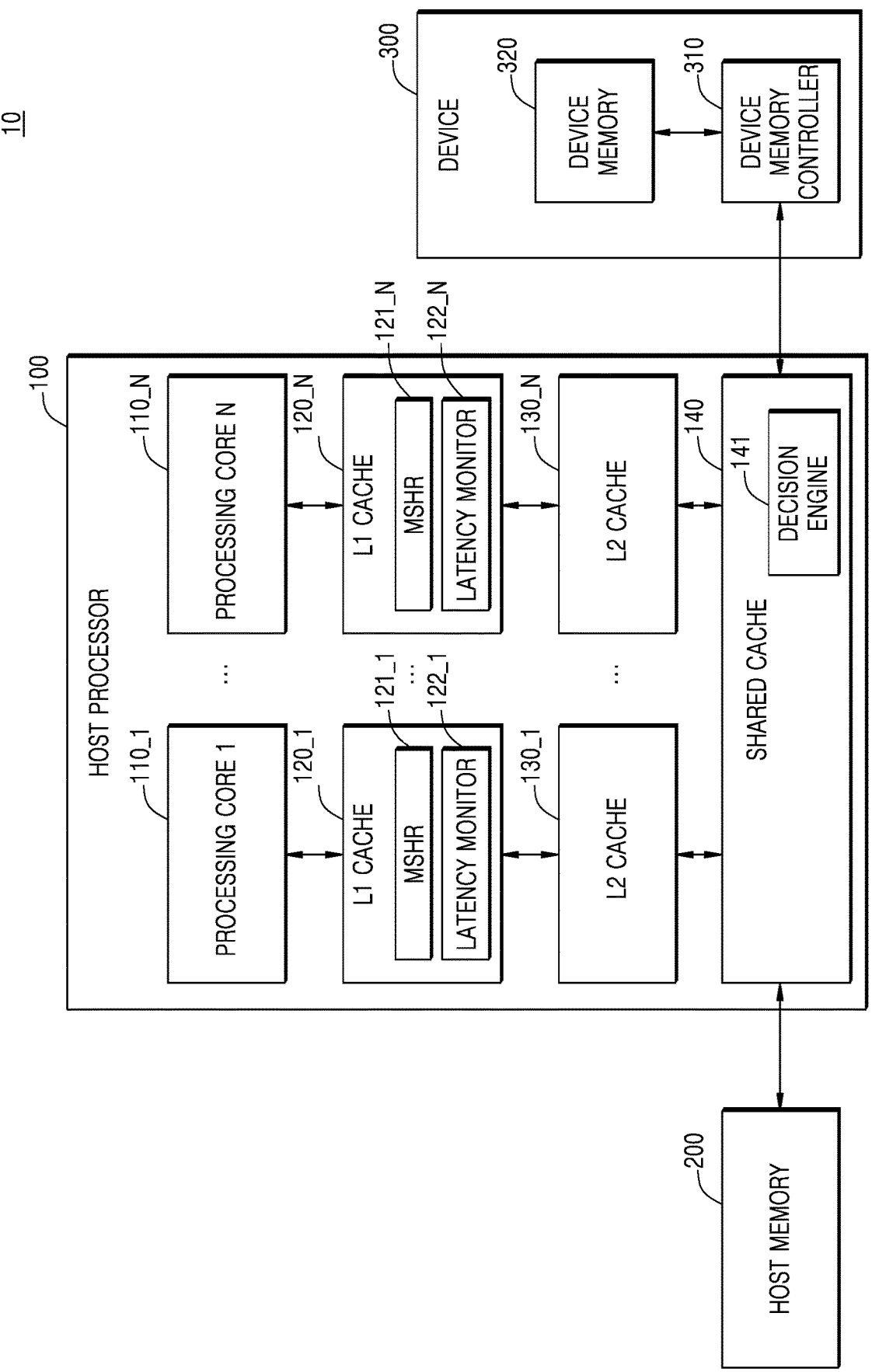
FIG. 2 is a block diagram illustrating a system according to an embodiment.

FIG. 2 is a block diagram illustrating the system 10 according to an embodiment. FIG. 2 may be described with reference to FIG. 1, and redundant descriptions thereof may be omitted.

Referring to FIG. 2, the system 10 may include the host processor 100, the host memory 200, and the device 300. Hereinafter, the host processor 100 may be referred to as a processor, the host memory 200 may be referred to as a first memory or a near memory, and the device 300 may be referred to as a second memory or a far memory.

The host processor 100 may include first to Nth processing cores 110_1 to 110_N, where N is an integer greater than 1. Each processing core may be a hardware capable of independently executing instructions from other processing cores and may be referred to as a CPU, a processor core, a core, or the like. The host processor 100 may be referred to as a multi-core processor.

The host processor 100 may include N first level caches 120_1 to 120_N, N second level caches 130_1 to 130_N, and a shared cache 140. In an example embodiment, the first to Nth processing cores 110_1 to 110_N may correspond to the first level caches 120_1 to 120_N, respectively. Referring to FIG. 2, for example, the first level cache 120_1 may correspond to the first processing core 110_1, and the first level cache 120_N may correspond to the Nth processing core 110_N. The second level cache 130_1 may correspond to the first processing core 110_1, and the second level cache 130_N may correspond to the Nth processing core 110_N. However, embodiments are not limited thereto. The first level caches 120_1 to 120_N and the second level caches 130_1 to 130_N may respectively correspond to each other. Referring to FIG. 2, for example, the first level cache 120_1 may correspond to the second level cache 130_1, and the first level cache 120_N may correspond to the second level cache 130_N. Herein, each of the first level caches 120_1 to 120_N may be referred to as a level-1 (L1) cache, and each of the second level caches 130_1 to 130_N may be referred to as a level-2 (L2) cache. The shared cache 140 may be referred to as a last level cache (LLC) or a level-3 (L3) cache.

In an embodiment, each of the first to Nth processing cores 110_1 to 110_N may execute a series of instructions stored in the host memory 200 or the device 300. Herein, processing of a request by the host processor 100 may mean that each of the first to Nth processing cores 110_1 to 110_N executes a series of instructions stored in the host memory 200 or the device 300 or reads data stored in the host memory 200 or the device 300 to perform a task. Hereinafter, for convenience of description, it is assumed that the host processor 100 processes a request by accessing data stored in the host memory 200 or the device 300 and fetching the data stored therein.

Instructions and/or data required for the host processor 100 to process a request may be stored in the host memory 200 or the device 300. The system 10 may be implemented according to a memory hierarchy, and instructions and/or data stored in the host memory 200 or the device 300 may be cached in at least one of the first level caches 120_1 to 120_N, the second level caches 130_1 to 130_N, and the shared cache 140.

In an embodiment, a particular processing core may access a corresponding first level cache. For example, the first processing core 110_1 may access the first level cache 120_1.

The first level caches 120_1 to 120_N may cache data stored in the second level caches 130_1 to 130_N respectively corresponding thereto. For example, the first level cache 120_1 may cache data stored in the second level cache 130_1. When a cache miss occurs in the first level caches 120_1 to 120_N, the host processor 100 may access the second level caches 130_1 to 130_N respectively corresponding to the first level caches 120_1 to 120_N.

The second level caches 130_1 to 130_N may cache data stored in the shared cache 140. For example, the second level cache 130_1 may cache data stored in the shared cache 140. When a cache miss occurs in the second level caches 130_1 to 130_N, the host processor 100 may access the shared cache 140.

The shared cache 140 may cache data stored in the host memory 200 and the device 300. When a cache miss occurs in the shared cache 140, the host processor 100 may access the host memory 200 or the device 300.

The N first level caches 120_1 to 120_N may respectively include miss state registers 121_1 to 121_N (i.e., cache miss state registers) and latency monitors 122_1 to 122_N. For example, the first level cache 120_1 may include the miss state register 121_1 and the latency monitor 122_1. Similarly, the first level cache 120_N may include the miss state register 121_N and the latency monitor 122_N. Herein, a miss state register may be referred to as a miss state holding register (MSHR).

When a cache miss occurs in a first level cache, a corresponding one of the miss state registers 121_1 to 121_N may store state information related to the cache miss. A detailed description of the miss state registers 121_1 to 121_N is provided below with reference to FIG. 3.

The latency monitors 122_1 to 122_N may measure an access latency of the host processor 100 to the host memory 200 or the device 300 and may provide information related to the measured access latency to a decision engine 141. A detailed description of the latency monitors 122_1 to 122_N is provided below with reference to FIG. 3.

The shared cache 140 may include the decision engine 141. The decision engine 141 may divide a memory space of the shared cache 140 based on access latency information received from the latency monitors 122_1 to 122_N. In some embodiments, the dividing of the shared cache 140 may be referred to as partitioning.

In an embodiment, the memory space of the shared cache 140 may be divided into a first partition and a second partition. The first partition may be used as a cache memory for caching data stored in the host memory 200, and the second partition may be used as a cache memory for caching data stored in the device 300. For example, the first partition may be allocated to the host memory 200, and the second partition may be allocated to the device 300. For example, when a cache miss occurs in the shared cache 140 and the host processor 100 may retrieve data from the host memory 200, the retrieved data may be cached in the first partition of the shared cache 140. For example, when a cache miss occurs in the shared cache 140 and the host processor 100 may retrieve data from the device 300, the retrieved data may be cached in the second partition of the shared cache 140. A detailed description on the dividing of the shared cache 140 is provided below with reference to FIGS. 3 and 4.

The host memory 200 may write or read data and perform a refresh operation under the control of a host memory controller. The host memory controller may be included in the host processor 100 or may be arranged outside the host processor 100. For example, the host memory 200 may be dynamic random-access memory (DRAM), such as synchronous DRAM (SDRAM), double data rate (DDR) SDRAM, low power DDR (LPDDR) SDRAM, and graphics DDR (GDDR) SDRAM. The host memory 200 may be implemented as a memory module. For example, the host memory 200 may be implemented as an unbuffered dual in-line memory module (DIMM) (UDIMM), a registered DIMM (RDIMM), a load-reduced DIMM (LRDIMM), a fully-buffered DIMM (FBDIMM), a small outline DIMM (SODIMM), or the like.

In an embodiment, the first to Nth processing cores 110_1 to 110_N may communicate with the host memory 200 based on a DDR interface.

The device 300 may include a device memory controller 310 and the device memory 320. Although FIG. 2 illustrates that the device memory 320 is included in the device 300, in some embodiments, the device memory 320 may be arranged outside of the device 300, as illustrated in FIG. 1. The device 300 may be a device for expanding a memory of the system 10. In some embodiments, the device 300 may be referred to as a memory expander. The device 300 may communicate with the host processor 100 based on a CXL interface. In some embodiments, a protocol between the device 300 and the host processor 100 may include protocols such as, but not limited to, PCI, PCIe, USB, and SATA.

The host processor 100 may access the device memory 320 through the device memory controller 310 of the device 300. The device memory 320 may write or read data and perform a refresh operation under the control of the device memory controller 310.

In an embodiment, the first to Nth processing cores 110_1 to 110_N may communicate with the device 300 based on a CXL interface.

As described above, by reducing a difference in average latency between the host memory 200 and the device memory 320 in the system 10 through dynamic cache allocation, memory interleaving performance through a memory system may be improved.

Figure 3:
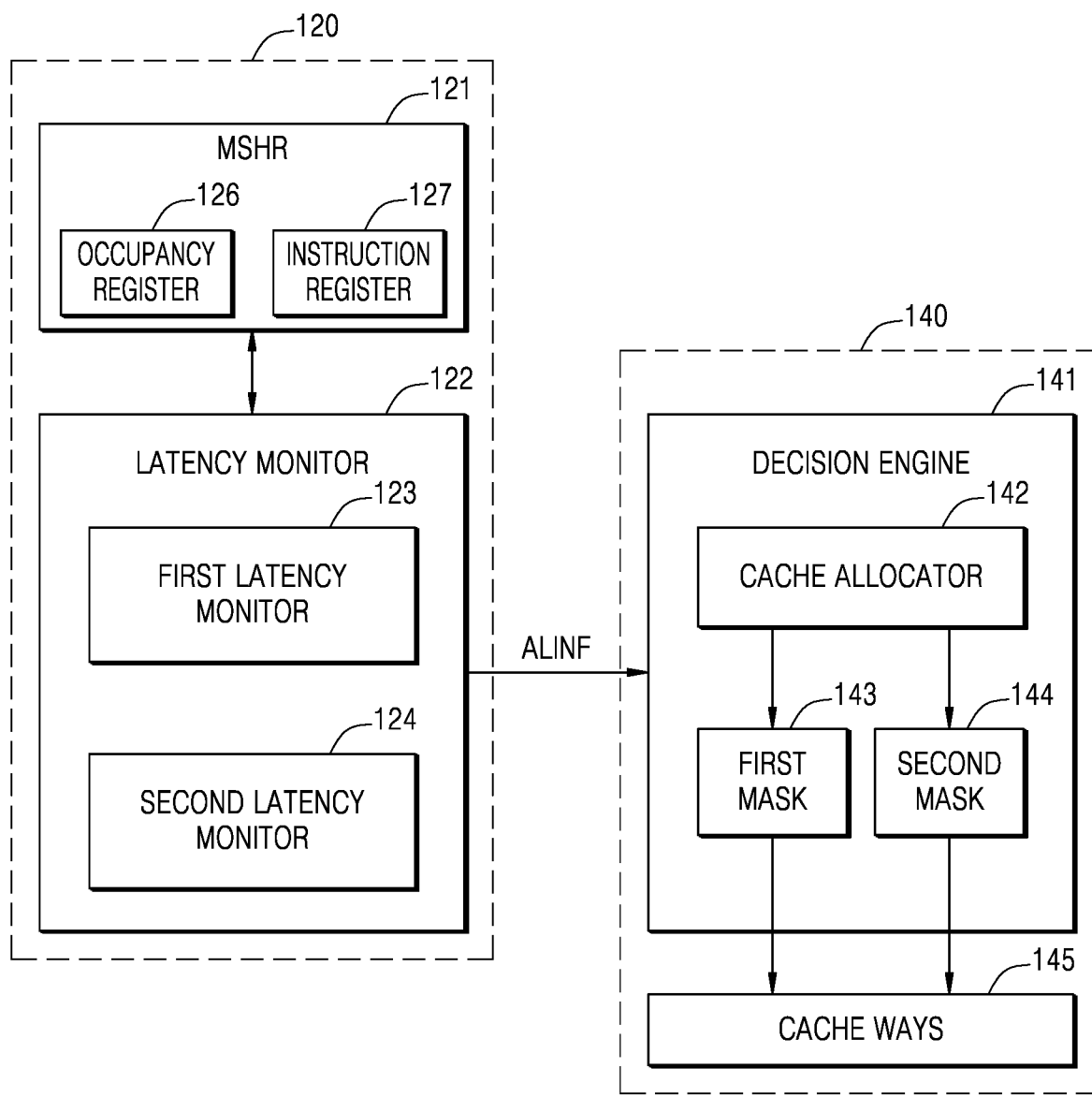
FIG. 3 is a block diagram illustrating a first level cache and a shared cache, according to an embodiment.

FIG. 3 is a block diagram illustrating a first level cache 120 and the shared cache 140, according to an embodiment. FIG. 3 may be described with reference to FIGS. 1 and 2, and redundant descriptions thereof may be omitted.

Referring to FIG. 3, the first level cache 120 is a representative example corresponding to one of the first level caches 120_1 to 120_N of FIG. 2. The first level cache 120 may include an MSHR 121 and a latency monitor 122.

The MSHR 121 may be configured to, when a cache miss occurs for a request originating from the host processor 100, store state information related to the cache miss. The MSHR 121 may include an occupancy register 126 and an instruction register 127. The occupancy register 126 may be configured to, when a cache miss occurs, store count information indicating the number of requests transmitted to the MSHR 121. The instruction register 127 may be configured to, when a cache miss occurs, store the number of requests transmitted to the MSHR 121 during a reference cycle period. Embodiments of the occupancy register 126 and the instruction register 127 are described below with reference to FIG. 4.

The latency monitor 122 may include a first latency monitor 123 and a second latency monitor 124. When a cache miss occurs in the first level cache 120, the latency monitor 122 may measure an access latency required for the host processor 100 to access the host memory 200 and the device 300. The latency monitor 122 may measure an access latency through values stored in the MSHR 121. The latency monitor 122 may provide access latency information ALINF to the decision engine 141 according to a measured value. The access latency information ALINF may include first access latency information and second access latency information. The first access latency information may include a first access latency measured by the first latency monitor 123. The second access latency information may include a second access latency measured by the second latency monitor 124. Herein, the first latency monitor 123 may be referred to as a first memory latency monitor or a near memory latency monitor. The second latency monitor 124 may be referred to as a second memory latency monitor or a far memory latency monitor. The first access latency information may be referred to as first latency information, and the second access latency information may be referred to as second latency information.

When a cache miss occurs in the first level cache 120, the first latency monitor 123 may measure a first access latency required for the host processor 100 to access the host memory 200. For example, the first access latency may be a time amount or a number of clocks required for the host processor 100 to access the host memory 200 and fetch data. As will be discussed later in FIG. 4, the latency monitor 122 may obtain an average delay cycle value by dividing the value stored in the occupancy register 126 by the value stored in the instruction register 127 during a reference cycle interval. The latency monitor 122 can calculate the first access latency by dividing the average delay cycle value by the clock frequency value of the processor 100.

When a cache miss occurs in the first level cache 120, the second latency monitor 124 may measure a second access latency required for the host processor 100 to access the device 300. For example, the second latency monitor 124 may measure the second access latency, which is a latency required for the host processor 100 to access the device 300 and fetch data.

In an embodiment, the host processor 100 may include a plurality of first level caches. In this case, the first access latency may refer to an average latency of access latencies measured from the plurality of first level caches. Herein, the first access latency may be referred to as a first average access latency. Similarly, the second access latency may refer to an average latency of access latencies measured from the plurality of first level caches. Herein, the second access latency may be referred to as a second average access latency.

The shared cache 140 may correspond to the shared cache 140 of FIG. 2. The shared cache 140 may include a cache allocator 142, a first mask 143, a second mask 144, and a plurality of cache ways 145. The decision engine 141 may divide the plurality of cache ways 145 into a first partition and a second partition. In other words, the plurality of cache ways 145 may be distinguished into the first partition configured to cache data stored in the host memory 200 and the second partition configured to cache data stored in the device 300. The dividing and distinguishing of the plurality of cache ways 145 into the first partition and the second partition is an example, and the number of partitions may increase when the number of devices 300 connected to the host processor 100 increases. For example, when the host processor 100 processes a request through data stored in the host memory 200, the device 300, and a second device, the number of partitions may be three. Herein, it is assumed that the host processor 100 is connected to the host memory 200 and the device 300, and thus, the number of partitions is two.

The first mask 143 and the second mask 144 may include masking values that are referenced by the cache allocator 142 to allocate the plurality of cache ways 145 to the first partition and the second partition. In some embodiments, the first mask 143 and the second mask 144 may be implemented as a software data structure or may be implemented as hardware, such as a register storing masking values.

The first mask 143 may include masking bits corresponding to the number of the plurality of cache ways 145. Herein, the first mask 143 may be referred to as a near mask, and the masking bits included in the first mask 143 may be referred to as a first masking value. In an embodiment, when the plurality of cache ways 145 are composed of eight cache ways, the first masking value of the first mask 143 may be a value consisting of eight bits.

The second mask 144 may include masking bits corresponding to the number of the plurality of cache ways 145. Herein, the second mask 144 may be referred to as a far mask, and the masking bits included in the second mask 144 may be referred to as a second masking value. In an embodiment, when the plurality of cache ways 145 are composed of eight cache ways, the second masking value of the second mask 144 may be a value consisting of eight bits.

The cache allocator 142 may receive the access latency information ALINF from the latency monitor 122. The cache allocator 142 may compare the sizes of the first access latency and the second access latency included in the access latency information ALINF. Based on a result of the comparison, the cache allocator 142 may adjust the first masking value of the first mask 143 and the second masking value of the second mask 144 to determine allocation of each of the plurality of cache ways 145 to the first partition or the second partition.

In an embodiment, when the first access latency and the second access latency have the same size or the system 10 is initially run, the same number of cache ways may be allocated to the first partition and the second partition. For example, when the plurality of cache ways 145 are composed of eight cache ways, the number of cache ways allocated to the first partition may be four, and the number of cache ways allocated to the second partition may be four.

In an embodiment, when the second access latency is greater than the first access latency, the decision engine 141 may reduce the difference between the first access latency and the second access latency by reducing the second access latency, which is an access latency to the device 300. The cache allocator 142 may adjust the first masking value and the second masking value to allocate, to the second partition, at least one cache way among first cache ways allocated to the first partition. A detailed description of adjusting allocation of cache ways through a masking value when the second access latency is greater than the first access latency is provided below with reference to FIGS. 7A to 7C.

In an embodiment, when the first access latency is greater than the second access latency, the decision engine 141 may reduce the difference between the first access latency and the second access latency by reducing the first access latency, which is an access latency to the host memory 200. The cache allocator 142 may adjust the first masking value and the second masking value to allocate, to the first partition, at least one cache way among second cache ways allocated to the second partition. A detailed description of adjusting allocation of cache ways through a masking value when the first access latency is greater than the second access latency is provided below with reference to FIGS. 8A to 8C.

Figure 4:
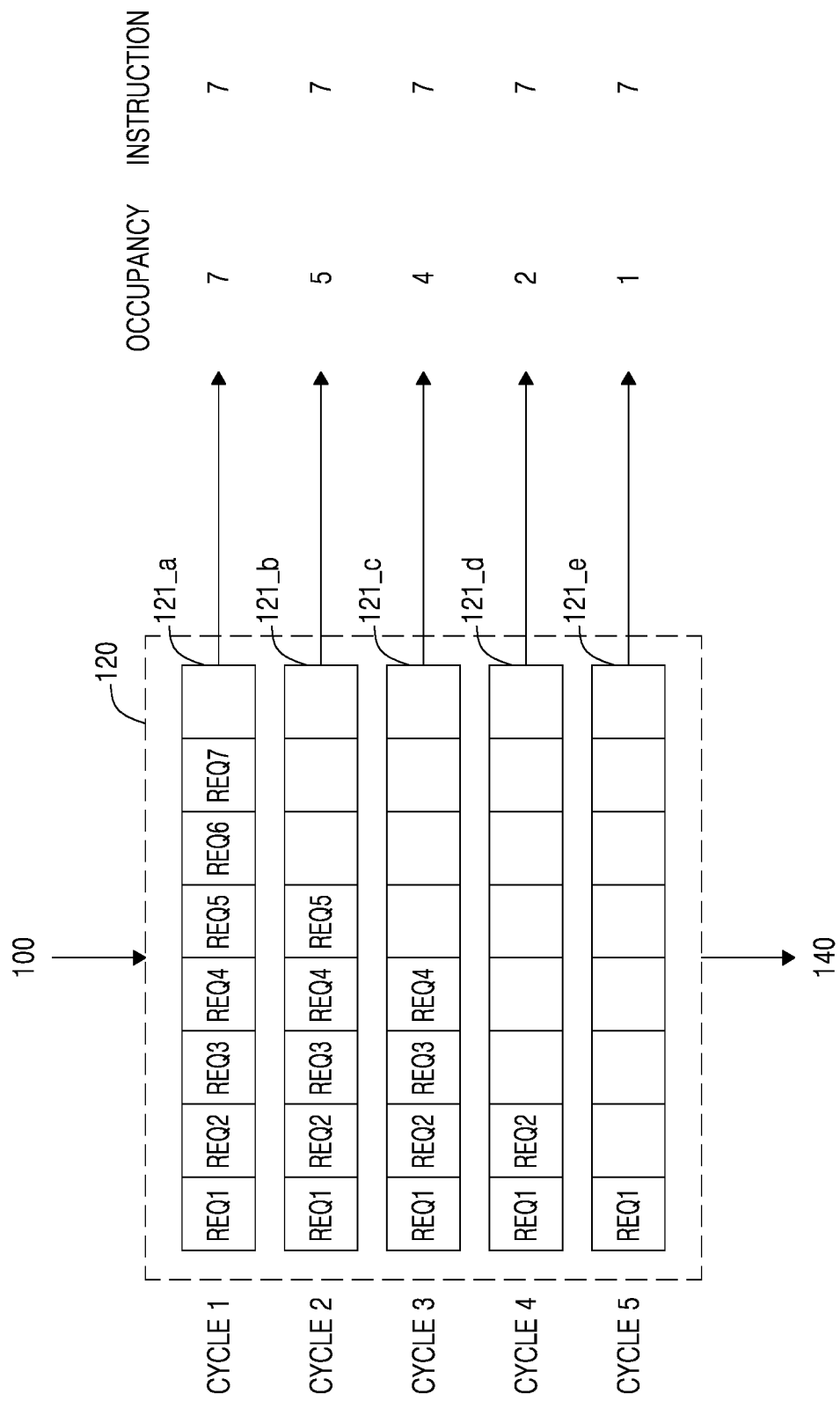
FIG. 4 is a block diagram illustrating access latency measurement according to an embodiment.

FIG. 4 is a block diagram illustrating access latency measurement according to an embodiment. FIG. 4 may be described with reference to FIG. 3, and redundant descriptions thereof may be omitted.

Referring to FIG. 4, the latency monitor 122 may measure an access latency of the host processor 100 to the host memory 200 and an access latency of the host processor 100 to the device 300 through the MSHR 121. In an embodiment, the latency monitor 122 may measure the access latencies of the host processor 100 to the host memory 200 and the device 300 during a reference cycle period and may generate the access latency information ALINF based on the measured access latencies. In some embodiments, the reference cycle period includes a plurality of clocks (e.g., 5 clocks as shown in FIG. 4). The occupancy register 126 may be configured to, when a cache miss occurs, store count information indicating the number of requests transmitted to the MSHR 121 in each clock of the plurality of clocks. The instruction register 127 may be configured to, when a cache miss occurs, store the number of requests transmitted to the MSHR 121 during the reference cycle period.

Herein, a cycle may refer to a clock cycle of the host processor 100. The reference cycle period may be defined according to a value stored in the host processor 100, that is, a preset value, or may be newly defined according to settings of a user. Hereinafter, it is assumed that the reference cycle period refers to a time period during which a total of five cycles, that is, first to fifth cycles CYCLE1 to CYCLE5, elapse. It is assumed that the MSHR 121 is a register capable of storing miss states related to a total of eight requests. The MSHR 121 being able to store eight miss states of requests is an example, and the MSHR 121 may store fewer or more miss states of requests.

The latency monitor 122 may measure (or count) the numbers of occupancy states and instructions of the MSHR 121 for every cycle. The latency monitor 122 may measure an access latency by performing a computation based on the measured numbers of occupancy states and instructions. Hereinafter, an MSHR 121_$a$ may indicate the MSHR 121 at the first cycle CYCLE1. An MSHR 121_$b$ may indicate the MSHR 121 at the second cycle CYCLE2. An MSHR 121_c may indicate the MSHR 121 at the third cycle CYCLE3. An MSHR 121_d may indicate the MSHR 121 at the fourth cycle CYCLE4. An MSHR 121_e may indicate the MSHR 121 at the fifth cycle CYCLE5. In an embodiment, at the first cycle CYCLE1, it is assumed that a total of seven requests, that is, first to seventh requests REQ1 to REQ7, are stored in the MSHR 121. The first to seventh requests REQ1 to REQ7 being stored in the MSHR 121 may mean a situation in which data related to the first to seventh requests REQ1 to REQ7 originating from the host processor 100 is not present in all of the first level cache 120, the second level cache 130, and the shared cache 140, and thus, a cache miss occurs. Accordingly, the host processor 100 may need to access data stored in the host memory 200 and the device 300 to process the first to seventh requests REQ1 to REQ7. Because the number of requests stored in the MSHR 121_a at the first cycle CYCLE1 is seven, the value stored in the occupancy register 126 may be 7. Because the number of requests transmitted to the MSHR 121_a during the reference cycle period is seven, the value stored in the instruction register 127 may be 7. Hereinafter, for convenience of description, it is assumed that the host processor 100 accesses the host memory 200 to access data stored in the host memory 200. That is, the data related to the first to seventh requests REQ1 to REQ7 is stored in the host memory 200, and a method by which the latency monitor 122 measures the first access latency is described below.

At the second cycle CYCLE2, data related to the sixth and seventh requests REQ6 and REQ7 stored in the host memory 200 may be cached in the first level cache 120 through the shared cache 140 and a second level cache 130. For example, data related to the sixth and seventh requests REQ6 and REQ7 may be retrieved from the host memory 200 to fill the first level cache 120, the second level cache 130 and the shared cache 140. For example, the second level cache may be the second level cache 130 of FIG. 1. Because the data related to the sixth and seventh requests REQ6 and REQ7 is present in the first level cache 120, state information for the sixth and seventh requests REQ6 and REQ7 may be removed from the MSHR 121. Because the number of requests stored in the MSHR 121 at the second cycle CYCLE2 is five, the value stored in the occupancy register 126 may be 5. Because the number of requests transmitted to the MSHR 121 during the reference cycle period is seven, the value stored in the instruction register 127 may be 7.

At the third cycle CYCLE3, data related to the fifth request REQ5 stored in the host memory 200 may be cached in the first level cache 120 through the shared cache 140 and the second level cache 130. For example, data related to the fifth request REQ5 may be retrieved from the host memory 200 to fill the first level cache 120, the second level cache 130 and the shared cache 140. Because the data related to the fifth request REQ5 is present in the first level cache 120, state information for the fifth request REQ5 may be removed from the MSHR 121. Because the number of requests stored in the MSHR 121 at the third cycle CYCLE3 is four, the value stored in the occupancy register 126 may be 4. Because the number of requests transmitted to the MSHR 121 during the reference cycle period is seven, the value stored in the instruction register 127 may be 7.

At the fourth cycle CYCLE4, data related to the third and fourth requests REQ3 and REQ4 stored in the host memory 200 may be cached in the first level cache 120 through the shared cache 140 and the second level cache 130. For example, data related to the third and fourth requests REQ3 and REQ4 may be retrieved from the host memory 200 to fill the first level cache 120, the second level cache 130 and the shared cache 140. Because the data related to the third and fourth requests REQ3 and REQ4 are present in the first level cache 120, state information for the third and fourth requests REQ3 and REQ4 may be removed from the MSHR 121. Because the number of requests stored in the MSHR 121 at the fourth cycle CYCLE4 is two, the value stored in the occupancy register 126 may be 2. Because the number of requests transmitted to the MSHR 121 during the reference cycle period is seven, the value stored in the instruction register 127 may be 7.

At the fifth cycle CYCLE5, data related to the second request REQ2 stored in the host memory 200 may be cached in the first level cache 120 through the shared cache 140 and the second level cache 130. For example, data related to the second request REQ2 may be retrieved from the host memory 200 to fill the first level cache 120, the second level cache 130 and the shared cache 140. Because the data related to the second request REQ2 is present in the first level cache 120, state information for the second request REQ2 may be removed from the MSHR 121. Because the number of requests stored in the MSHR 121 at the fifth cycle CYCLE5 is one, the value stored in the occupancy register 126 may be 1. Because the number of requests transmitted to the MSHR 121 during the reference cycle period is seven, the value stored in the instruction register 127 may be 7.

The latency monitor 122 may measure an access latency based on the values stored in the occupancy register 126 and the instruction register 127 during the reference cycle period. In an embodiment, the total cycle value obtained by adding up all the values stored in the occupancy register 126 during the first to fifth cycles CYCLE1 to CYCLE5 may be divided by the total instruction value stored in the instruction register 127, and the resulting value may be divided by the clock frequency of the host processor 100 to measure the access latency.

For example, in FIG. 4, the total cycle value obtained by adding up all the values stored in the occupancy register 126 during the first to fifth cycles CYCLE1 to CYCLE5 may be 19. Because the requests transmitted to the MSHR 121 during the first to fifth cycles CYCLE1 to CYCLE5 are the first to seventh requests REQ1 to REQ7, the total instruction value, which indicates the total number of requests transmitted to the MSHR 121 during the reference cycle period, may be 7. Accordingly, the resulting value obtained by dividing the total cycle value by the total instruction value may be 19/7, and in this case, the first access latency may refer to a value obtained by dividing 19/7 by the clock frequency of the host processor 100. The second access latency may be measured in the same manner as the first access latency.

Figure 5:
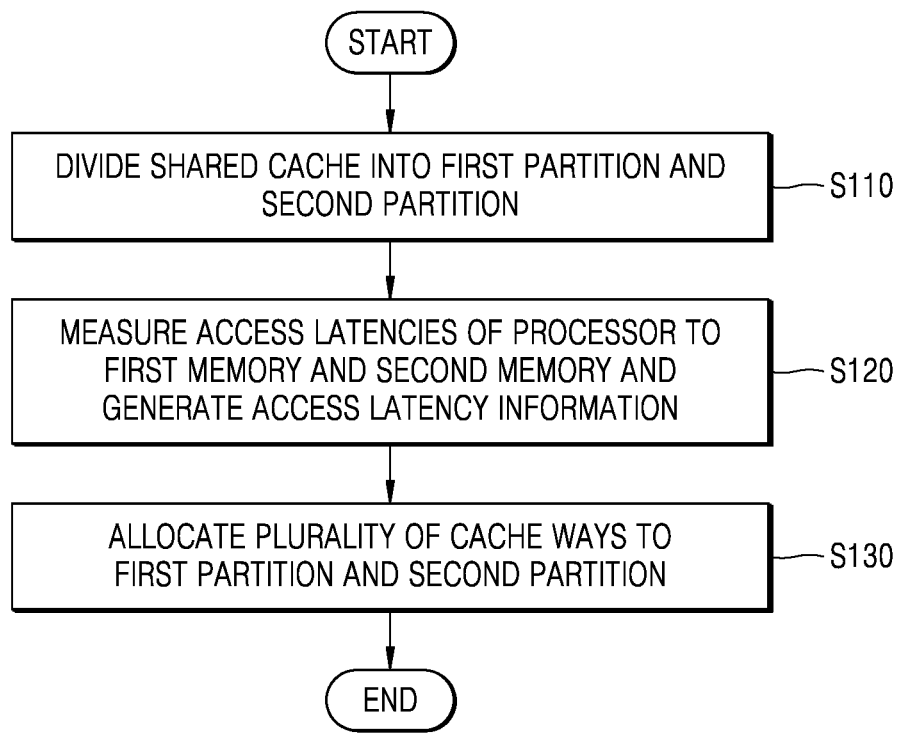
FIG. 5 is a flowchart illustrating an operating method of a host processor, according to an embodiment.

FIG. 5 is a flowchart illustrating an operating method of the host processor 100, according to an embodiment. FIG. 5 may be described with reference to FIGS. 2 and 3, and redundant descriptions thereof may be omitted.

Referring to FIG. 5, in operation S110, the host processor 100 may divide the shared cache 140 into a first partition and a second partition. In detail, for example, the host processor 100 may divide the shared cache 140 into the first partition and the second partition based on a masking value of the first mask 143 and a masking value of the second mask 144.

In an embodiment, data cached and stored in the shared cache 140 from the host memory 200 and the device 300 may be stored in the plurality of cache ways 145 included in the shared cache 140. The first partition may be a storage space in the shared cache 140 for caching data stored in the host memory 200. The second partition may be a storage space in the shared cache 140 for caching data stored in the device 300.

In an embodiment, at least one of cache ways included in the plurality of cache ways 145 may be allocated to the first partition based on the masking value of the first mask 143. At least one of the cache ways included in the plurality of cache ways 145 may be allocated to the second partition based on the masking value of the second mask 144.

In an embodiment, when the system 10 is initially run, the first partition and the second partition may be the same size. The size of a partition may correspond to the number of cache ways allocated to the partition. For example, when the plurality of cache ways 145 are composed of eight cache ways, four cache ways may be allocated to the first partition and four cache ways may be allocated to the second partition.

In operation S120, the host processor 100 may measure access latencies of the host processor 100 to the host memory 200 and the device 300 and may generate the access latency information ALINF. For example, the host processor 100 may generate first latency information including a first access latency to the host memory 200 and second latency information including a second access latency to the device 300.

In an embodiment, when a cache miss for a request of the host processor 100 occurs, the first access latency, which is the access latency of the host processor 100 to the host memory 200, may be calculated, and the first latency information may be generated based on the first access latency.

In an embodiment, when a cache miss for a request of the host processor 100 occurs, the second access latency, which is the access latency of the host processor 100 to the device 300, may be calculated, and the second latency information may be generated based on the second access latency.

In operation S130, the host processor 100 may allocate the plurality of cache ways 145 to the first partition and the second partition based on the access latency information ALINF. The allocating of the plurality of cache ways 145 to the first partition and the second partition in operation S130 may be referred to as re-allocating of the plurality of cache ways 145 to be distinguished from the dividing of the plurality of cache ways 145 in operation S130. For example, the host processor 100 may allocate the plurality of cache ways 145 to the first partition and the second partition based on the lengths of the first access latency and the second access latency. The host processor 100 may compare the sizes of the first access latency and the second access latency. Based on a result of the comparison, the host processor 100 may allocate the plurality of cache ways 145 to the first partition and the second partition. That is, the host processor 100 may adjust first cache ways previously allocated to the first partition to be allocated to the second partition. Similarly, the host processor 100 may adjust second cache ways previously allocated to the second partition to be allocated to the first partition.

In an embodiment, in response to a result that the first access latency is less than the second access latency, the host processor 100 may adjust the masking values of the first mask 143 and the second mask 144 to allocate, to the second partition, at least one cache way among the first cache ways allocated to the first partition.

In an embodiment, in response to a result that the second access latency is less than the first access latency, the host processor 100 may adjust the masking values of the first mask 143 and the second mask 144 to allocate, to the first partition, at least one cache way among the second cache ways allocated to the second partition.

Figure 6:
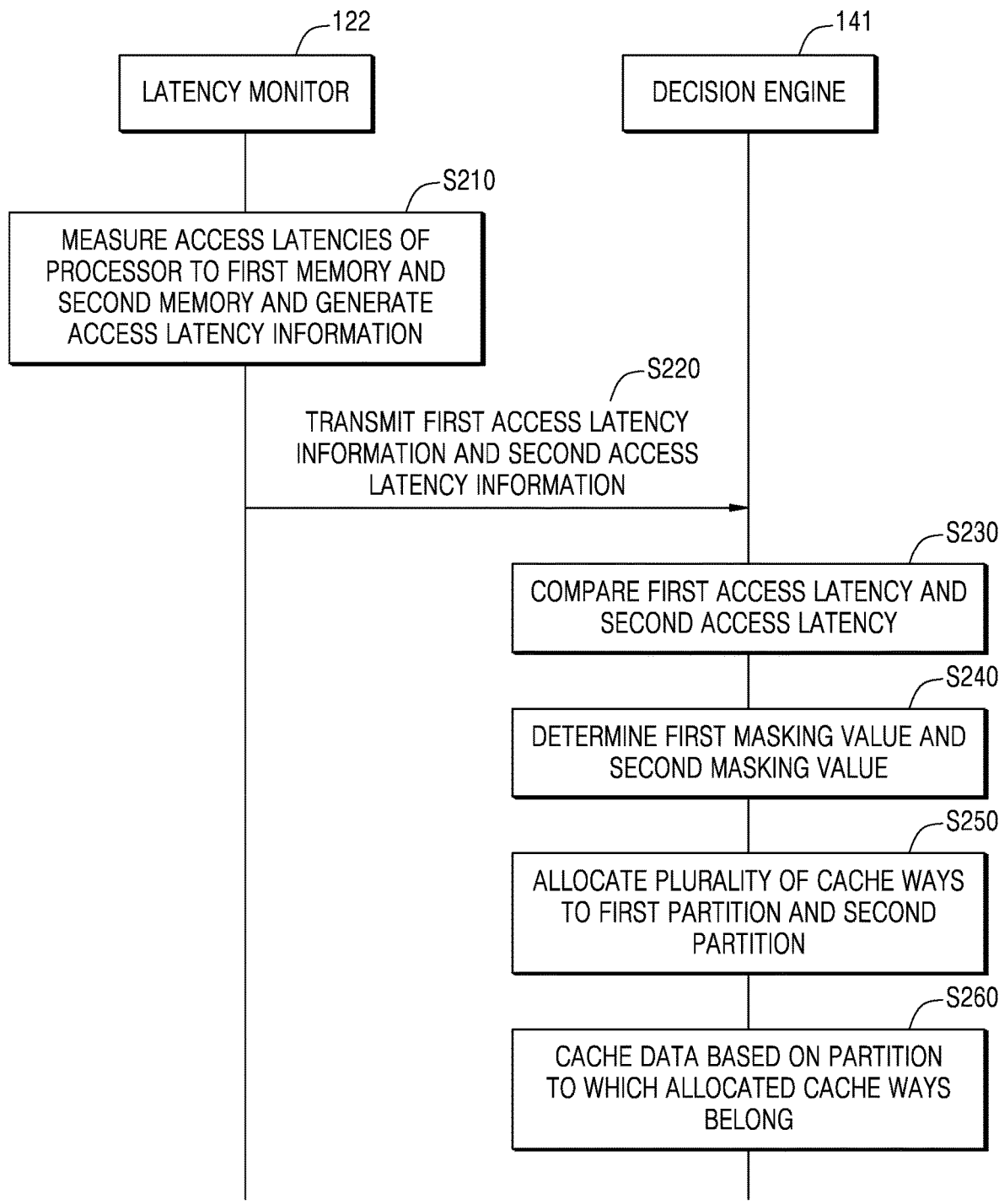
FIG. 6 is a diagram illustrating an operating method of a host processor, according to an embodiment.

FIG. 6 is a diagram illustrating an operating method of the host processor 100, according to an embodiment. FIG. 6 may be described with reference to FIGS. 2, 3, and 5, and redundant descriptions thereof may be omitted.

In the flowchart of FIG. 6, dynamic allocation of the plurality of cache ways 145 is illustrated. For example, the plurality of cache ways 145 may be dynamically allocated to the first partition and the second partition by the host processor 100 through the latency monitor 122, the decision engine 141, and the shared cache 140. It is assumed that the plurality of cache ways 145 are divided into the first partition and the second partition having the same size, according to operation S110 of FIG. 5.

Referring to FIG. 6, in operation S210, the latency monitor 122 may measure access latencies of the host processor 100 to the host memory 200 and the device 300 and may generate the access latency information ALINF. That is, the latency monitor 122 may generate first access latency information including a first access latency, which is the access latency of the host processor 100 to the host memory 200, and may generate second access latency information including a second access latency, which is the access latency of the host processor 100 to the device 300.

In operation S220, the latency monitor 122 may transmit the first access latency information and the second access latency information to the decision engine 141. For example, the latency monitor 122 may provide the access latency information ALINF measured in operation S210 to the decision engine 141. The access latency information ALINF may include the first access latency information and the second access latency information.

In operation S230, based on the first access latency information and the second access latency information received from the latency monitor 122, the decision engine 141 may compare the sizes of the first access latency and the second access latency.

In operation S240, based on a result of the comparison in operation S230, the decision engine 141 may determine a first masking value and a second masking value.

In an embodiment, when the first access latency is less than the second access latency, to reduce the second access latency, at least one of bit values corresponding to cache ways allocated to the first partition in the first masking value (e.g., cache ways having a masking bit of 1 in the first masking value) may be inverted, and at least one of bit values corresponding to cache ways not allocated to the second partition in the second masking value (e.g., cache ways having a masking bit of 0 in the second masking value) may be inverted.

In an embodiment, when the second access latency is less than the first access latency, to reduce the first access latency, at least one of bit values corresponding to cache ways allocated to the second partition in the second masking value (e.g., cache ways having a masking bit of 1 in the second masking value) may be inverted, and at least one of bit values corresponding to cache ways not allocated to the first partition in the first masking value (e.g., cache ways having a masking bit of 0 in the first masking value) may be inverted.

In an embodiment, the positions of bit values inverted in the first masking value and the second masking value may be the same. In other words, the first masking value and the second masking value may have complementary values. For example, when an upper third bit value of the first masking value is inverted, an upper third bit value of the second masking value may also be inverted.

In operation S250, based on the first masking value and the second masking value determined in operation S240, the decision engine 141 may allocate the plurality of cache ways 145 to the first partition and the second partition.

In operation S260, when the host processor 100 caches data in the shared cache 140 from the host memory 200 and the device memory 320, the decision engine 141 may cache data based on the partition to which the cache ways allocated in operation S250 belong. For example, when the host processor 100 caches data of the host memory 200 in the shared cache 140, the decision engine 141 may cache the data in the first partition. When the host processor 100 caches data of the device memory 320 in the shared cache 140, the decision engine 141 may cache the data in the second partition.

Figure 7A:
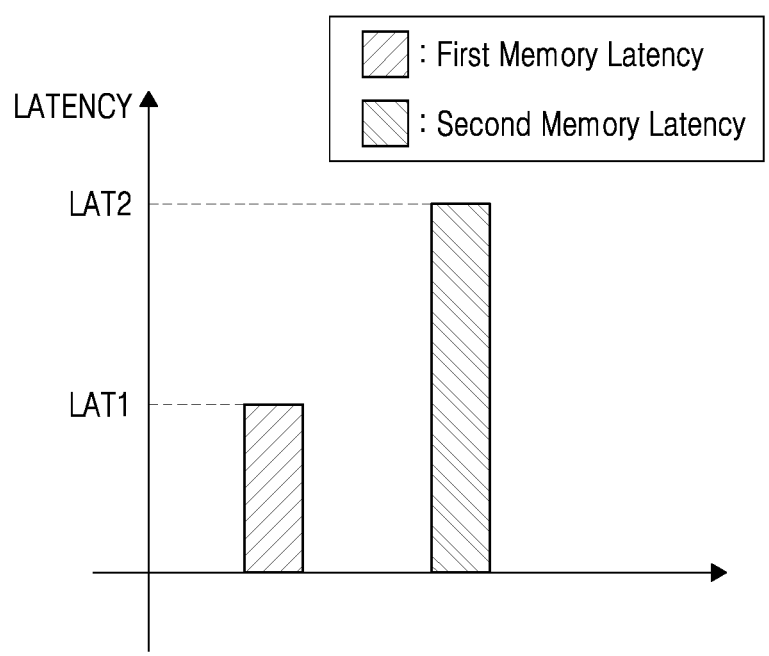
FIGS. 7A to 7C are diagrams illustrating a method of dynamically allocating a shared cache when a first access latency is less than a second access latency.
Figure 7B:
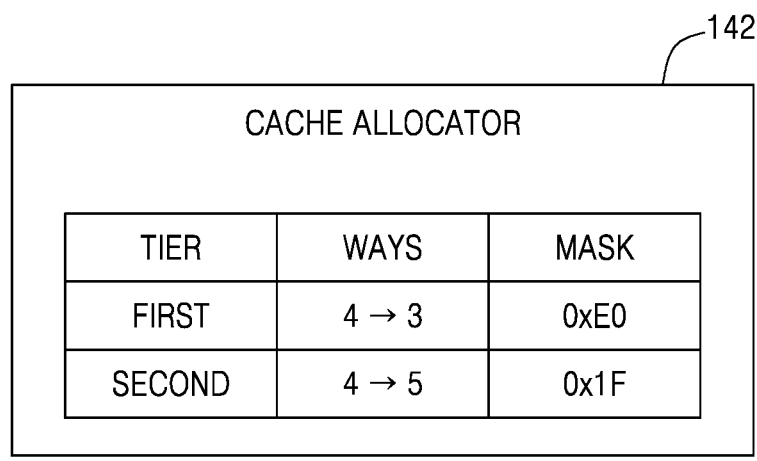
Figure 7C:
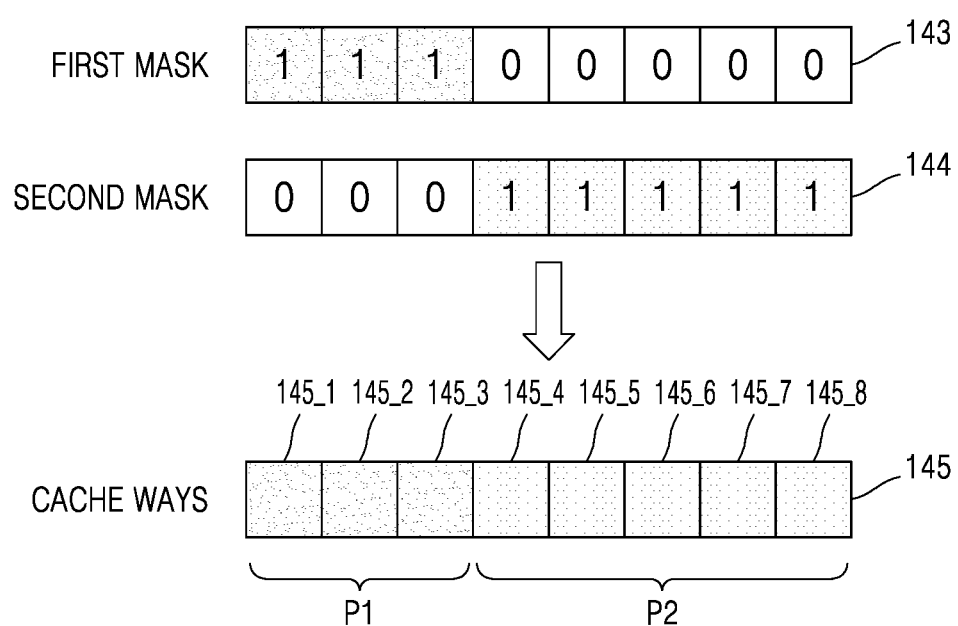

FIGS. 7A to 7C are diagrams illustrating a method of dynamically allocating the shared cache 140 when a first access latency LAT1 is less than a second access latency LAT2. FIGS. 7A to 7C may be described with reference to FIGS. 2, 3, 5, and 6, and redundant descriptions thereof may be omitted.

In FIGS. 7A to 7C, it is assumed that the plurality of cache ways 145 include first to eighth cache ways 145_1 to 145_8, the eight cache ways are divided into a first partition P1 and a second partition P2, the first to fourth cache ways 145_1 to 145_4 are allocated to the first partition P1, and the fifth to eighth cache ways 145_5 to 145_8 are allocated to the second partition P2.

FIG. 7A is a graph showing the first access latency LAT1 and the second access latency LAT2. In an embodiment, referring to FIG. 7A, the first access latency LAT1 measured by the latency monitor 122 may be less than the second access latency LAT2 measured by the latency monitor 122.

FIG. 7B is a diagram illustrating determination of a first masking value and a second masking value by the cache allocator 142. In an embodiment, referring to FIG. 7B, based on the sizes of the first access latency LAT1 and the second access latency LAT2, the cache allocator 142 may allocate the plurality of cache ways 145 to the first partition P1 and the second partition P2. For example, when the size of the first access latency LAT1 is less than the size of the second access latency LAT2, the number of cache ways for the host memory 200 allocated to the first partition may be adjusted from four to three. Similarly, the number of cache ways for the device 300 allocated to the second partition may be adjusted from four to five. At this time, the first masking value may be 0xE0 when expressed in hexadecimal and may be 1110000 when expressed in binary. The second masking value may be 0x1F when expressed in hexadecimal and may be 00011111 when expressed in binary.

FIG. 7C is a diagram illustrating allocation of the plurality of cache ways 145 to the first partition P1 and the second partition P2 based on masking values adjusted in FIG. 7B. In an embodiment, referring to FIG. 7C, upper three bits of the first masking value indicated by the first mask 143 may have a value of 1, and upper three bits of the second masking value corresponding thereto may have a value of 0. The first to third cache ways 145_1 to 145_3 may be allocated to the first partition P1. Similarly, lower five bits of the first masking value indicated by the first mask 143 may have a value of 0, and lower five bits of the second masking value corresponding thereto may have a value of 1. The fourth to eighth cache ways 145_4 to 145_8 may be allocated to the second partition P2.

Figure 8A:
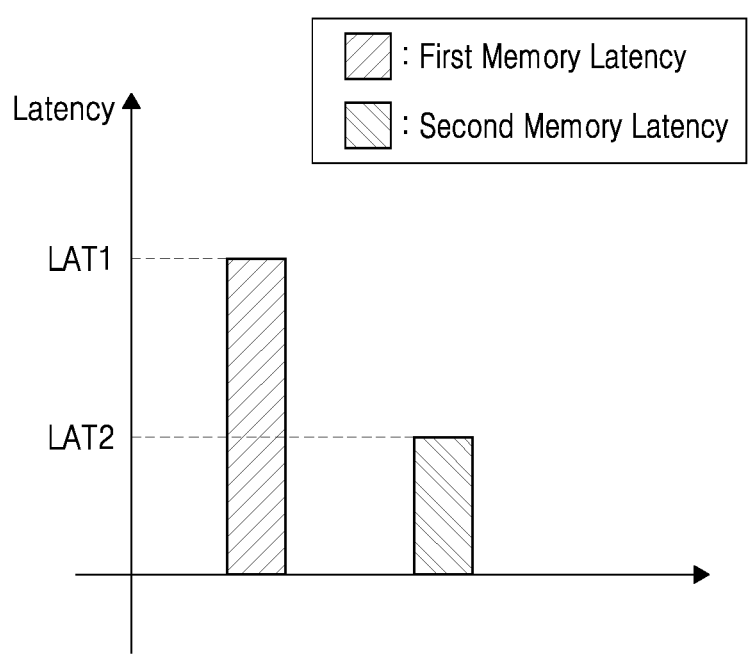
FIGS. 8A to 8C are diagrams illustrating a method of dynamically allocating a shared cache when a second access latency is less than a first access latency.
Figure 8B:
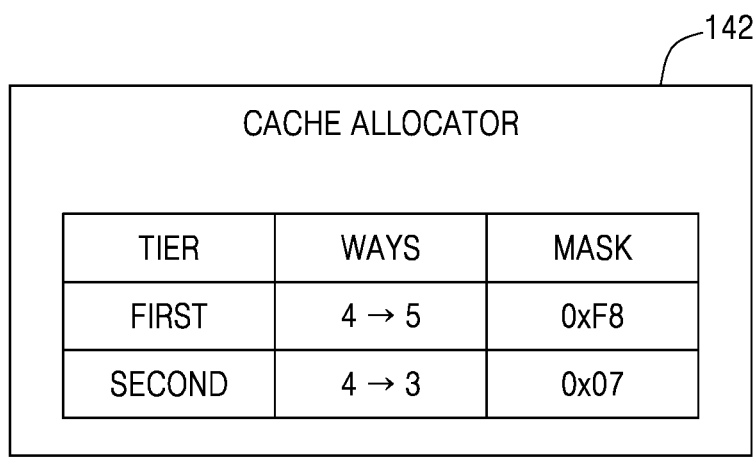
Figure 8C:
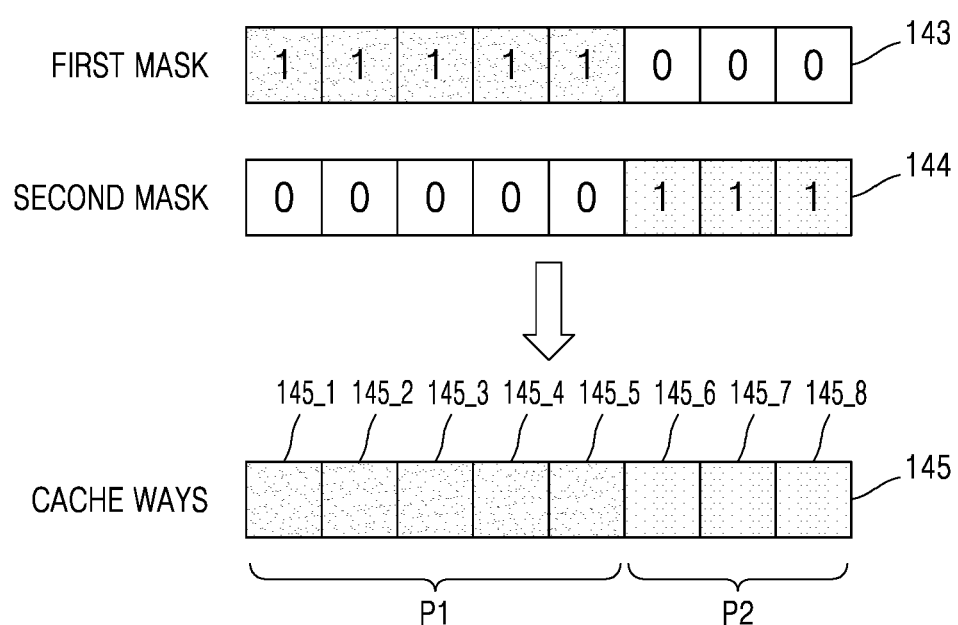

FIGS. 8A to 8C are diagrams illustrating a method of dynamically allocating the shared cache 140 when a second access latency LAT2 is less than a first access latency LAT1. FIGS. 8A to 8C may be described with reference to FIGS. 2, 3, 5, and 6, and redundant descriptions thereof may be omitted.

In FIGS. 8A to 8C, it is assumed that the plurality of cache ways 145 include first to eighth cache ways 145_1 to 145_8, the eight cache ways are divided into a first partition P1 and a second partition P2, the first to fourth cache ways 145_1 to 145_4 are allocated to the first partition P1, and the fifth to eighth cache ways 145_5 to 145_8 are allocated to the second partition P2.

FIG. 8A is a graph showing the first access latency LAT1 and the second access latency LAT2. In an embodiment, referring to FIG. 8A, the second access latency LAT2 measured by the latency monitor 122 may be less than the first access latency LAT1 measured by the latency monitor 122.

FIG. 8B is a diagram illustrating determination of a first masking value and a second masking value by the cache allocator 142. In an embodiment, referring to FIG. 8B, based on the sizes of the first access latency LAT1 and the second access latency LAT2, the cache allocator 142 may allocate the plurality of cache ways 145 to the first partition P1 and the second partition P2. That is, because the size of the second access latency LAT2 is less than the size of the first access latency LAT1, the number of cache ways for the host memory 200 allocated to the first partition may be adjusted from four to five. Similarly, the number of cache ways for the device 300 allocated to the second partition may be adjusted from four to three. At this time, the first masking value may be 0xF8 when expressed in hexadecimal and may be 11111000 when expressed in binary. The second masking value may be 0x07 when expressed in hexadecimal and may be 00000111 when expressed in binary.

FIG. 8C is a diagram illustrating allocation of the plurality of cache ways 145 to the first partition P1 and the second partition P2 based on the masking values adjusted in FIG. 8B. In an embodiment, referring to FIG. 8C, upper five bits of the first masking value indicated by the first mask 143 may have a value of 1, and upper five bits of the second masking value corresponding thereto may have a value of 0. The first to fifth cache ways 145_1 to 145_5 may be allocated to the first partition P1. Similarly, lower three bits of the first masking value indicated by the first mask 143 may have a value of 0, and lower three bits of the second masking value corresponding thereto may have a value of 1. The sixth to eighth cache ways 145_6 to 145_8 may be allocated to the second partition P2.

Figure 9A:
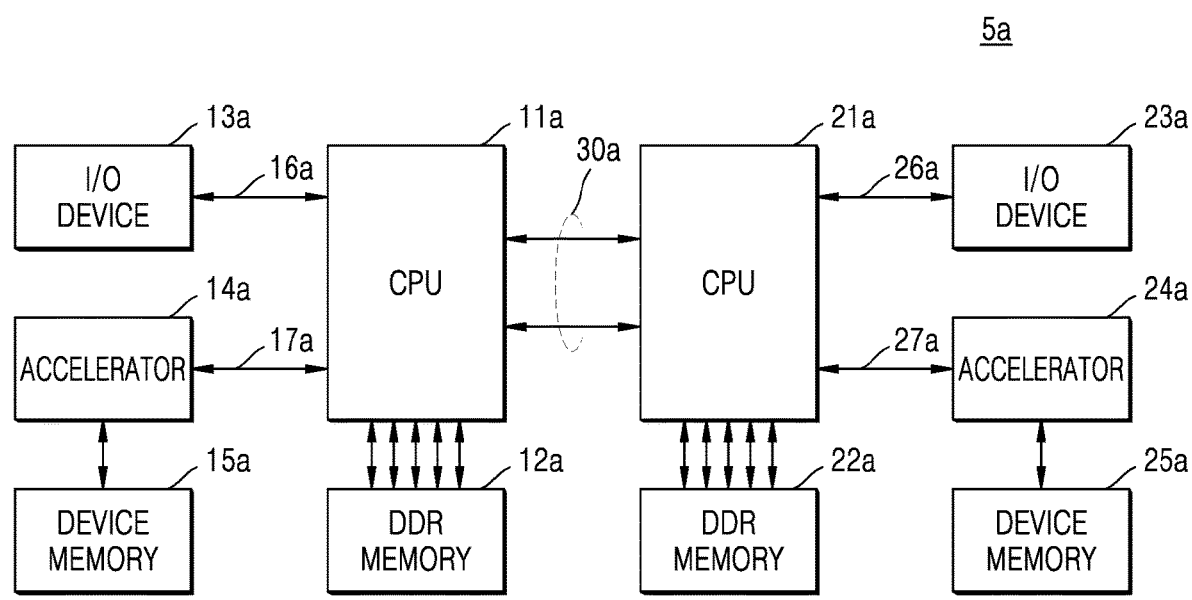
FIGS. 9A and 9B are diagrams illustrating examples of a system according to embodiments.
Figure 9B:
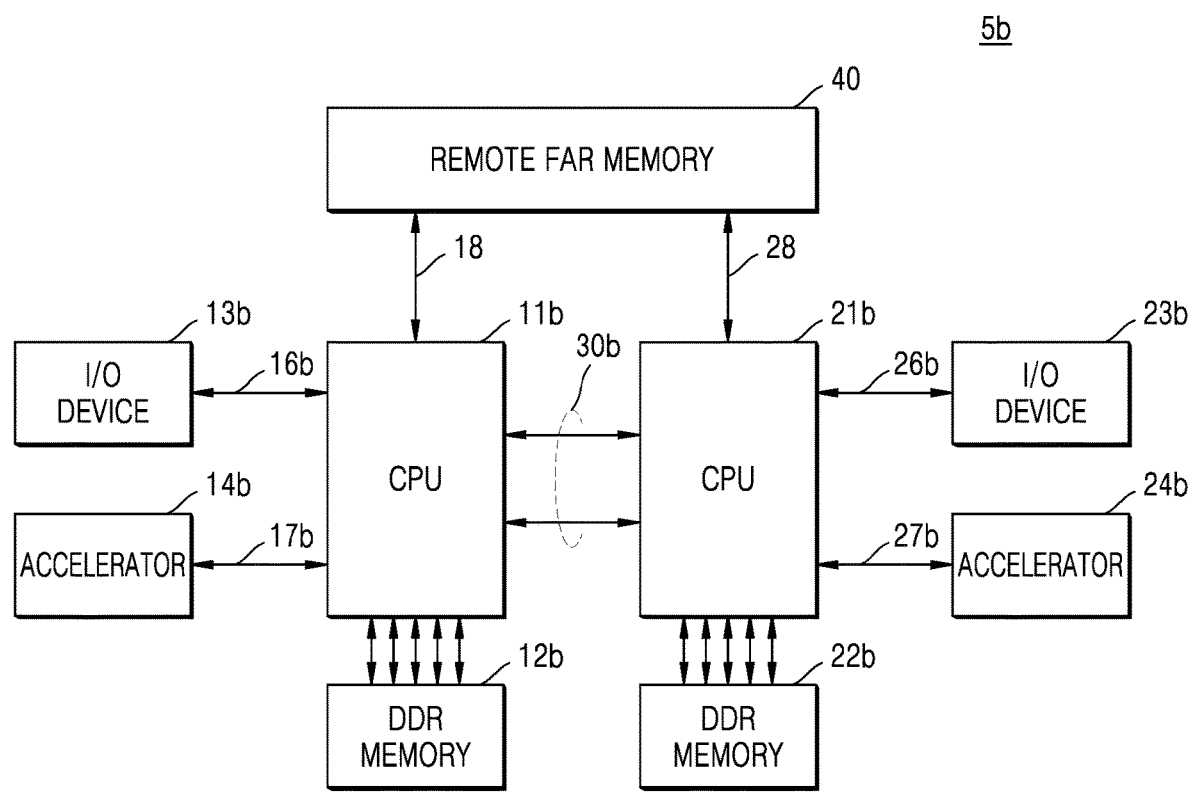

FIGS. 9A and 9B are diagrams illustrating examples of a system according to embodiments. For example, the block diagrams of FIGS. 9A and 9B illustrate systems 5a and 5b that include multiple CPUs.

Referring to FIG. 9A, the system 5a may include a first CPU 11a and a second CPU 21a and may include a first DDR memory 12a and a second DDR memory 22a respectively connected to the first CPU 11a and the second CPU 21a. The first CPU 11a and the second CPU 21a may be connected with each other through an interconnect system 30a based on a processor interconnect technology. As illustrated in FIG. 9A, the interconnect system 30a may provide at least one CPU-to-CPU coherent link.

The system 5a may include a first I/O device 13a and a first accelerator 14a that communicate with the first CPU 11a and may include a first device memory 15a connected to the first accelerator 14a. The first CPU 11a and the first I/O device 13a may communicate with each other through a bus 16a, and the first CPU 11a and the first accelerator 14a may communicate with each other through a bus 17a. The system 5a may include a second I/O device 23a and a second accelerator 24a that communicate with the second CPU 21a and may include a second device memory 25a connected to the second accelerator 24a. The second CPU 21a and the second I/O device 23a may communicate with each other through a bus 26a, and the second CPU 21a and the second accelerator 24a may communicate with each other through a bus 27a. In some embodiments, at least one of the first device memory 15a and the second device memory 25a may be omitted from the system 5a.

Communications based on at least some of multiple protocols may be performed through the buses 16a, 17a, 26a, and 27a. For example, information such as initial settings may be transmitted through each of the buses 16a, 17a, 26a, and 27a based on a non-coherent protocol. Messages and/or data may be transmitted based on a coherent protocol and/or a memory protocol through the buses 17a and 27a.

The first CPU 11a may select one of multiple protocols, for example, a memory protocol and a non-coherent protocol, based on the size of data and may access the first device memory 15a based on the selected protocol. Accordingly, an optimal protocol may be selected, and a latency related to access to the first device memory 15a may be reduced. The second CPU 21a may select one of multiple protocols, for example, a memory protocol and a non-coherent protocol, based on the size of data and may access the second device memory 25a based on the selected protocol. Accordingly, an optimal protocol may be selected, and a latency related to access to the second device memory 25a may be reduced.

Referring to FIG. 9B, the system 5b may include first and second CPUs 11b and 21b, first and second DDR memories 12b and 22b, first and second I/O devices 13b and 23b, and first and second accelerators 14b and 24b, similar to the system 5a of FIG. 9A, and may further include a remote far memory 40. Communications based on at least some of multiple protocols may be performed through the buses 16b, 17b, 18, 26b, 27b, and 28. The first CPU 11b and the second CPU 21b may be connected to the remote far memory 40 through buses 18 and 28, respectively. The remote far memory 40 may be used for expansion of a memory in the system 5b, and the buses 18 and 28 may be used as memory expansion ports. In some embodiments, the remote far memory 40 may be omitted from the system 5b.

While the inventive concept has been particularly shown and described with reference to embodiments thereof, it will be understood that various changes in form and details may be made therein without departing from the spirit and scope of the following claims.

What is claimed is:

1. A processor comprising:
a processing core configured to process each of a plurality of requests by accessing a corresponding one of a first memory and a second memory;
a latency monitor configured to generate first latency information and second latency information, the first latency information comprising a first access latency to the first memory, and the second latency information comprising a second access latency to the second memory;
a plurality of cache ways divided into a first partition and a second partition; and
a decision engine configured to allocate each of the plurality of cache ways to one of the first partition and the second partition, based on the first latency information and the second latency information.

2. The processor of claim 1,
wherein the decision engine is further configured to:
cache first data obtained, in response to the plurality of requests, from the first memory in the first partition; and
cache second data obtained, in response to the plurality of requests, from the second memory in the second partition.

3. The processor of claim 2,
wherein the latency monitor comprises:
a first latency monitor configured to, in response to a cache miss for the plurality of requests, calculate the first access latency to the first memory and output the first latency information to the decision engine; and
a second latency monitor configured to, in response to the cache miss for the plurality of requests, calculate the second access latency to the second memory and output the second latency information to the decision engine.

4. The processor of claim 3, further comprising:
a cache miss state register configured to, in response to the cache miss for the plurality of requests in a reference cycle period, store state information for the cache miss related to the plurality of requests,
wherein the reference cycle period includes a plurality of clocks, and
wherein the cache miss state register comprises:
an occupancy register configured to store a first number of the plurality of requests transmitted to the cache miss state register in each clock of the plurality of clocks; and
an instruction register configured to store a second number of the plurality of requests transmitted to the cache miss state register during the reference cycle period.

5. The processor of claim 3, wherein the decision engine comprises:
a first mask comprising a plurality of first masking values, wherein each of the plurality of first masking values indicates whether a corresponding cache way of the plurality of cache ways is allocated to the first partition;
a second mask comprising a plurality of second masking values, wherein each of the plurality of second masking values indicates whether a corresponding cache way of the plurality of cache ways is allocated to the second partition; and
a cache allocator configured to compare the first access latency and the second access latency and allocate each of the plurality of cache ways to one of the first partition and the second partition, based on a comparison result of the first access latency and the second access latency.

6. The processor of claim 5,
wherein the cache allocator is further configured to:
in response to the comparison result of the first access latency being less than the second access latency, allocate at least one cache way among a plurality of first cache ways allocated to the first partition of the plurality of cache ways to the second partition, by adjusting the plurality of first masking values and the plurality of second masking values; and
in response to the comparison result of the second access latency being less than the first access latency, allocate at least one cache way among a plurality of second cache ways allocated to the second partition of the plurality of cache ways to the first partition, by adjusting the plurality of first masking values and the plurality of second masking values.

7. The processor of claim 1,
wherein the processing core is further configured to:
communicate with the first memory through a double data rate (DDR) interface; and
communicate with the second memory through a compute express link (CXL) interface.

8. The processor of claim 1, further comprising:
a first level cache, a second level cache, and a shared cache,
wherein the shared cache is configured to cache data received from the first memory and the second memory,
wherein the second level cache is configured to cache data from the shared cache, and
wherein the first level cache is configured to cache data from the second level cache.

9. An operating method of a processor, the operating method comprising:
dividing a plurality of cache ways into a first partition and a second partition, based on a first masking value and a second masking value, the first masking value being a masking value of a first mask, and the second masking value being a masking value of a second mask;
generating first latency information and second latency information, the first latency information comprising a first access latency to a first memory, and the second latency information comprising a second access latency to a second memory; and
allocating the plurality of cache ways to the first partition and the second partition, based on sizes of the first access latency and the second access latency.

10. The operating method of claim 9,
wherein the dividing of the plurality of cache ways into the first partition and the second partition comprises:
allocating a first number of the plurality of cache ways to the first partition, based on the first masking value; and
allocating a second number of the plurality of cache ways to the second partition, based on the second masking value.

11. The operating method of claim 9,
wherein the generating of the first latency information and the second latency information comprises:
in response to a cache miss for a plurality of requests of the processor, calculating the first access latency of the processor to the first memory and the second access latency of the processor to the second memory and generating the first latency information and the second latency information.

12. The operating method of claim 11,
wherein the allocating of the plurality of cache ways to the first partition and the second partition comprises:
in response to a result that the first access latency is less than the second access latency, allocating at least one cache way among a plurality of first cache ways allocated to the first partition among the plurality of cache ways to the second partition, by adjusting the first masking value and the second masking value; and
in response to a result that the second access latency is less than the first access latency, allocating at least one cache way among second cache ways allocated to the second partition among the plurality of cache ways to the first partition, by adjusting the first masking value and the second masking value.

13. The operating method of claim 9, further comprising:
communicating between the processor and the first memory through a double data rate (DDR) interface; and
communicating between the processor and the second memory through a compute express link (CXL) interface.

14. A system comprising:
a processor comprising a plurality of processing cores, a first level cache, and a shared cache;
a host memory configured to store data related to a plurality of requests of the processor; and
a device configured to store data related to the plurality of requests of the processor,
wherein the first level cache comprises:
a latency monitor configured to generate first latency information and second latency information, the first latency information comprising a first access latency to the host memory, and the second latency information comprising a second access latency to the device, and
wherein the shared cache comprises:
a plurality of cache ways divided into a first partition and a second partition, wherein a plurality of first cache ways among the plurality of cache ways are allocated to the first partition and a plurality of second cache ways among the plurality of cache ways are allocated to the second partition; and
a decision engine configured to allocate each of the plurality of cache ways to one of the first partition and the second partition, based on the first latency information and the second latency information, which are received from the latency monitor.

15. The system of claim 14,
wherein the decision engine is further configured to:
cache first data obtained, in response to the plurality of requests, from the host memory in the first partition; and
cache second data obtained, in response to the plurality of requests, from the device in the second partition.

16. The system of claim 15,
wherein the latency monitor comprises:
a first latency monitor configured to, in response to a cache miss for the plurality of requests, calculate the first access latency to the host memory and output the first latency information to the decision engine; and
a second latency monitor configured to, in response to the cache miss for the plurality of requests, calculate the second access latency to the device and output the second latency information to the decision engine.

17. The system of claim 16,
wherein the first level cache further comprises:
a cache miss state register configured to, in response to the cache miss for the plurality of requests in a reference cycle period, store state information for the cache miss related to the plurality of requests,
wherein the reference cycle period includes a plurality of clocks, and
wherein the cache miss state register comprises:
an occupancy register configured to store a first number of the plurality of requests transmitted to the cache miss state register in each clock of the plurality of clocks; and an instruction register configured to store a second number of the plurality of requests transmitted to the cache miss state register during the reference cycle period.

18. The system of claim 16, wherein the decision engine comprises:
- a first mask comprising a plurality of first masking values, wherein each of the plurality of first masking values indicates whether a corresponding cache way of the plurality of cache ways is allocated to the first partition;
- a second mask comprising a plurality of second masking values, wherein each of the plurality of second masking values indicates whether a corresponding cache way of the plurality of cache ways is allocated to the second partition; and
- a cache allocator configured to compare the first access latency and the second latency and allocate each of the plurality of cache ways to one of the first partition and the second partition, based on a comparison result of the first access latency and the second access latency.

19. The system of claim 18, wherein the cache allocator is further configured to:
- in response to the comparison result of the first access latency being less than the second access latency, allocate, to the second partition, at least one cache way among the plurality of first cache ways allocated to the first partition of the plurality of cache ways, by adjusting the plurality of first masking values and the plurality of second masking values; and
- in response to the comparison result of the second access latency being less than the first access latency, allocate, to the first partition, at least one cache way among the plurality of second cache ways allocated to the second partition of the plurality of cache ways, by adjusting the plurality of first masking values and the plurality of second masking values.

20. The system of claim 14, wherein each of the plurality of processing cores is configured to:
- communicate with the host memory through a double data rate (DDR) interface; and
- communicate with the device through a compute express link (CXL) interface.

* * * * *